United States Patent [19]
Weiser

[11] 3,918,814
[45] Nov. 11, 1975

[54] OPTICAL POSITION SENSOR
[75] Inventor: Sidney Weiser, Silver Spring, Md.
[73] Assignee: Weiser/Robodyne Corporation, Silver Spring, Md.
[22] Filed: May 13, 1974
[21] Appl. No.: 469,708

[52] U.S. Cl. ............... 356/156; 356/138; 356/153; 356/172
[51] Int. Cl.² ........................................ G01B 11/00
[58] Field of Search ........... 356/138, 153, 156, 162, 356/172, 209; 350/55; 250/203 R, 211 R

[56] References Cited
UNITED STATES PATENTS

| | | | |
|---|---|---|---|
| 3,531,205 | 9/1970 | Nussmeier | 356/153 |
| 3,551,057 | 12/1970 | Hamilton et al. | 356/153 |
| 3,610,755 | 10/1971 | Wieberger et al. | 350/96 |
| 3,614,439 | 10/1971 | Beelik, Jr. | 356/138 |
| 3,614,449 | 10/1971 | Ward | 250/203 |
| 3,703,682 | 11/1972 | Wickman et al. | 356/153 |

*Primary Examiner*—Ronald L. Wibert
*Assistant Examiner*—Richard A. Rosenberger
*Attorney, Agent, or Firm*—Rose & Edell

[57] ABSTRACT

An optical position sensor includes a light source, a lens system and a four quadrant photo-sensitive detector, all located in a compact housing. Light from the source emanates from the principal focus of the lens system which therefore collimates the sensing beam emitted from the housing. The four quadrant detector is positioned to receive light reflected by an external object back through the lens system. In a preferred embodiment the light source is an inexpensive low power lamp; the flux density of the light from the lamp is increased by a tapered fiber optic pipe whose output end is positioned at the principal focus of the lens system. The fiber optic pipe also acts to eliminate the image of the lamp filament from the sensing beam. The four quadrant detector may be located on or off the lens system axis, depending upon whether or not a suitable reflector element is used for the return light energy. Differences between energy levels detected in the four quadrants indicate the X-Y position of the external object relative to lens axis. Z position of the object is manifested by the size of the image reflected onto the detector and therefore is measurable by radially segmenting the detector and sensing the presence of an image in different radial segments.

17 Claims, 11 Drawing Figures

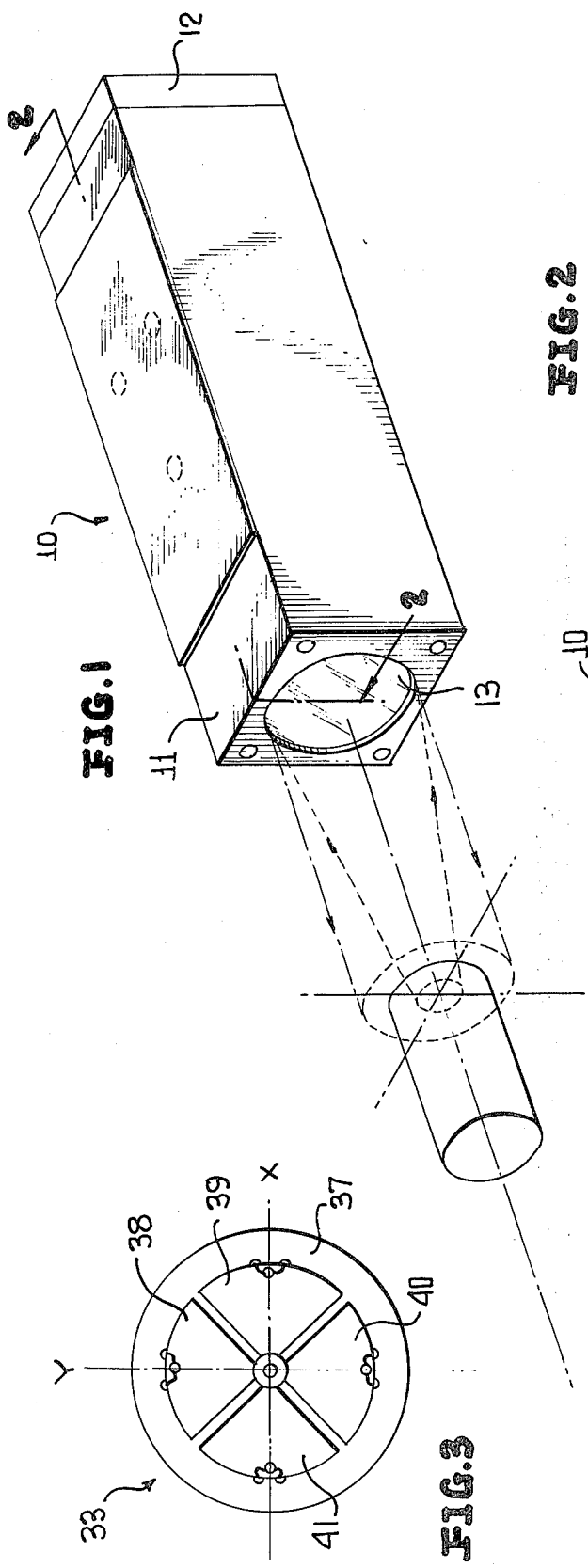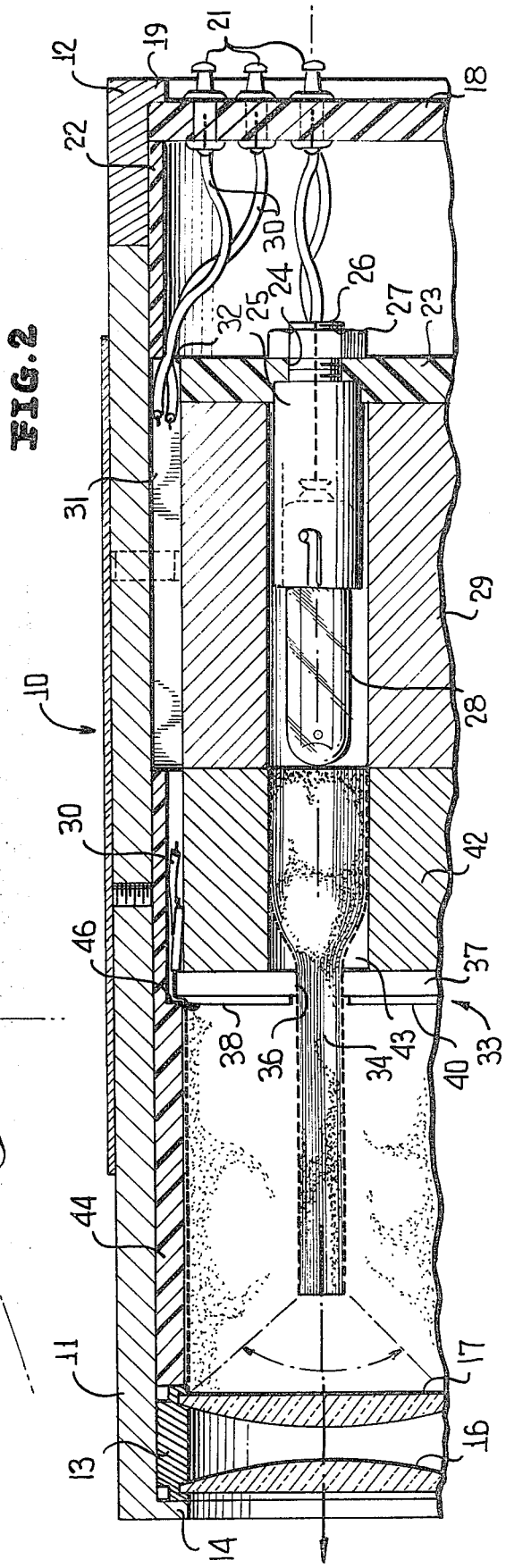

OPTICAL POSITION SENSOR

BACKGROUND OF THE INVENTION

The present invention relates to position sensors and, more particularly, to a compact optical position sensor capable of position-sensing along two or three axes.

Optical two-axis position sensors, as they exist in the prior art, have certain distinct limitations (reference: U.S. Pat. Nos. 3,470,377 to Le Febre et al and 3,603,688 to Smith-Vaniz). Such sensors, when used to sense translation normal to the optical axis of the sensor, utilize a collimated light beam source mounted on the sensed object. The collimated light is detected by a four quadrant photo-sensitive detector which is spaced from the sensed object and arranged to provide an electrical signal representing off-axis translation of the object. This arrangement is considerably less than ideal for many reasons. For one thing, alignment of the light source and detector is required each time the sensor is used and such alignment is both time-consuming and tedious. Moreover, each time the sensor is used the light beam must be focused on the detector. Another thing, the arrangement is useless for those position-sensing operations in which the sensed object is not suitable for mounting a light source thereon. These and other disadvantages have created a need for an optical two-axis position sensor which is permanently aligned, requires no focusing and has substantially universal application. It is an object of the present invention to provide such a sensor.

Interestingly, the Le Febre et al patent is primarily concerned with sensing rotation (rather than translation) of an object about an axis perpendicular to the optical axis. For rotation sensing the object, in Le Febre et al, need not carry a light source but must have a highly reflective or mirrored surface capable of re-directing light back toward the four quadrant detector. As the mirrored surface pivots about either of two axes which are normal to the optical axis, the reflected light sweeps across the four quadrant detector. Le Febre et al expressly state that their system can be used for sensing of translation within the plane normal to the optical axis, but this requires the light source to be mounted on the sensed object.

It is another object of the present invention to provide an optical two-axis translation sensor in which the light source and detector are located in a common housing and which does not require the sensed object to have a mirrored surface.

It is still another object of the present invention to provide a compact, highly accurate, yet inexpensive two-axis position sensor.

It is also an object of the present invention to provide a position sensor which is capable of sensing displacement of an object along three axes.

It is a further object of the present invention to provide an optical position sensor which can monitor the position of an object along two or three co-ordinates.

SUMMARY OF THE PRESENT INVENTION

In accordance with the principles of the present invention, a low power lamp serves as a light source which feeds a fiber optic pipe. The pipe terminates at the principal focus of a lens system which collimates the light into a sensing beam of parallel rays, imaged at infinity. An object in the path of the sensing beam reflects light from the beam back through the lens system and onto the surface of a four-quadrant detector. The object includes a surface or portion thereof of regular configuration and uniform reflectivity; however, such regularly configured surface is not mirrored and can, in fact, have zero reflectivity if the background is white. Since the sensing beam is imaged at infinity the sensed area of the object need not be specially focused on the four-quadrant detector but instead can be positioned anywhere within a relatively large range of displacement distances from the sensor.

The size of the object reflected onto the detector is related to the position of the sensed object along the axis. Thus each detector quadrant may be subdivided into plural radially-spaced segments whereby reflected images of different sizes appear in different numbers of segments. Object position along the Z-axis may therefore be determined by detecting output levels from different radially-positioned detector segments.

The fiber optic pipe is tapered to reduce beam spread and increase the light flux density from that of the lamp. In addition the pipe serves to eliminate the image of the lamp filament from the sensing beam so that the flux density of the beam is rendered uniform.

The lamp, fiber optic pipe, lens system and four-quadrant detector are all located in a compact housing designed for efficient light transmission. The lamp and fiber optic pipe are located on the optical axis of the lens system; the four-quadrant detector may be located on the axis or not, depending upon whether or not a reflector is employed to re-direct the light returned through the lens system by the sensed object.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a view in perspective of the optical sensor of the present invention in position to sense displacement of a target object transversely of the optical axis of the sensor;

FIG. 2 is a plan view in section taken along lines 2—2 of FIG. 1;

FIG. 3 is a plan view of the four-quadrant detector employed in the sensor of FIGS. 1 and 2;

DESCRIPTION OF PREFERRED EMBODIMENTS

Figure 4:
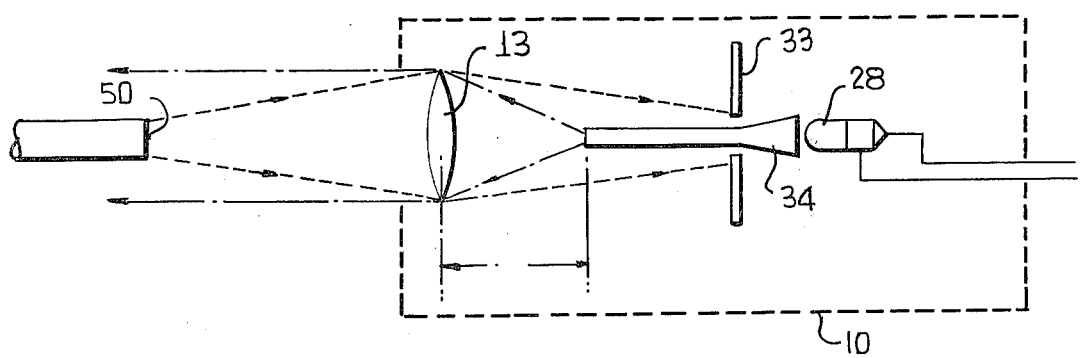
FIG. 4 is an optical schematic diagram illustrating the operation of the sensor of FIGS. 1 and 2.

Referring specifically to FIGS. 1 and 2 of the accompanying drawings, the sensor of the present invention is entirely contained in a compact housing 10. Although housing 10 is illustrated as being of rectangular longitudinal cross-section and square transverse cross-section, other configurations are possible within the limitations imposed by the operating characteristics described herein. The housing 10 includes a hollow metal casing 11 and an apertured rear endcap 12. The optical components for the sensor are disposed in a longitudinal bore defined through casing 11.

A lens assembly 13 is positioned at the front end of housing 10. Assembly 13 is of generally cylindrical configuration and of such diameter as to be slidably received within the housing bore. An annular shoulder 14 forms part of casing 11 and overhangs the front end of the housing to prevent the lens assembly from sliding out through the otherwise open front end. The lens assembly illustrated in FIG. 2 includes two plano-convex lenses 16, 17. The particular lenses employed are not critical, however, and any achromatic or multi-element lens assembly may be employed consistent with the operation described herein.

At the rear end of housing 10 a generally circular connector pin board 18 is positioned against an annular shoulder 19 projecting radially inward as part of end cap 12. Ten connector pins 21 extend through pin board 18 to provide means for effecting external electrical connections to components within housing 10. A hollow cylindrical spacer 22 of ceramic or other insulating material spaces pin board 18 from a generally circular lamp mounting plate 23. The outer diameter of spacer 22 is substantially equal to the diameter of the housing bore.

Lamp mounting plate 23 is made from insulative material and has a central aperture 24 defined therein. A lamp holder 25 (for example, of the bayonet mount type) extends forwardly of plate 23 and is mounted thereto by means of bushing 26 which extends through aperture 24 and is threadedly engaged by nut 27. A low power lamp 28 (for example, a 2.5 volt lamp of the type employed in pen-lights) is mounted in holder 25 symmetrically about the longitudinal axis of housing 10. As is common for such lamps, a condensing lens is built into the forward end of its bulb. Immediately forward of plate 23 and surrounding lamp holder 25 and lamp 28 is a cylindrical metal heat sink 29. The lamp and lamp holder reside in a longitudinally-extending central bore defined through the heat sink. The outer diameter of the heat sink 29 is approximately the same as the diameter of the bore in housing 10. Four longitudinally-extending slots 31 are defined in the periphery of heat sink 29 and are aligned with four respective notches 32 defined in the periphery of plate 23. Slots 31 and notches 32 serve as passages for pairs of electrical conductors 30 extending forwardly to a four-quadrant detector 33 from respective pairs of pins 21.

A fiber optic pipe 34 is positioned symmetrically about the longitudinal axis of housing 10 with its rear end immediately forward of lamp 28 to receive light emitted by the lamp. The fiber optic pipe tapers or narrows in a forward direction to increase the flux density of the light energy transmitted through the pipe. The forward end of fiber optic pipe 34 terminates at the point of principal focus of the lens assembly 13. Thusly positioned at the principal focus, the fiber optic pipe transmits light which is imaged at infinity by the lens assembly. In this regard, the illustrative representation of the forward end of the fiber optic pipe is larger than actual scale in FIG. 2 in order to facilitate understanding and visualization; actually, the relatively small forward end of the pipe represents a point source of light for all practical purposes in the sensor.

The small diameter forward portion of fiber optic pipe 34 projects through a central aperture 36 defined through four-quadrant detector 33. This detector, as best illustrated in FIG. 3, is a generally circular plate 37 having a forward-facing surface onto which four thin film photo-voltaic cells 38, 39, 40, 41 are adhered. The cells are each configured in the form of substantially 90° circle sectors positioned about aperture 36 and the longitudinal axis of housing 10 to define four quadrants, respectively. These quadrants are positioned such that cells 38 and 40 are bisected by an imaginary y-axis and cells 39 and 41 are bisected by an imaginary x-axis. These imaginary axes are used as references in the position sensing function and are described in that context hereinbelow.

The wide and tapering portion of the fiber optic pipe 34, residing between heat sink 29 and detector 33, is surrounded by an insulative spool 42. This spool is of generally cylindrical configuration and has a central longitudinal bore within which the fiber optic pipe extends. The bore is filled with epoxy 43 around the tapered portion of fiber optic pipe 34 to reduce play of the pipe in the bore and assure accurate positioning of the forward end of the pipe.

A hollow phenolic tube 44, of outer diameter substantially equal to the diameter of the bore in housing 10, extends from heat sink 29 forward to lens assembly 13. A longitudinal bore defined through tube 44 is divided into two sections of different diameter, the two sections intersecting at an annular shoulder 46. The section of larger diameter is in the rearward part of the tube and surrounds spool 42. In this regard there is sufficient space between spool 42 and tube 44 to permit passage therebetween of electrical conductors or wires 30. The outer edge of the forward surface of detector 33 is positioned flush against the annular shoulder 46. The forward part of the bore in tube 44 surrounds the narrowed portion of the fiber optic pipe 34 and has a non-reflective coating on its inner surface. Likewise, the outer surface of pipe 34 carries a coating of black paint or similar coating to prevent light leakage. By these expedients, the efficiency of light transmission through the fiber optic pipe and the lens assembly is optimized. In addition, the lenses in the assembly may be coated to reduce reflection.

Typical position sensing operation is diagrammatically illustrated in FIG. 4. The light rays represented by solid lines are those issuing from the effective point source at the forward end of the fiber optic pipe 34. Positioned at the principal focus of lens system 13, the forward end of the pipe emits a cone of light whose base is substantially equal to the cross-section of the lens system and which subtends an angle of approximately 60°. The light thus emitted from the point of principal focus is collimated and imaged at infinity by the lens system, as indicated by the parallel solid lines in FIG. 4.

If the target surface 50 lies in the path of the parallel rays and is smaller in area than the diameter of the lens assembly 13, part of the light beam is reflected by surface 50 back through the lens assembly. This reflected light is represented by dashed lines in FIG. 4. The reflected light, representing the image of target surface 50, is projected onto the four-quadrant detector 33. Importantly, although the sensing beam is imaged at infinity, the reflected light is returned at finite conjugates. This feature renders the unit insensitive to target distance from the unit over a relatively large range of distances. More particularly, a typical distance between the sensor and target would be twice the principal focal length of the lens system. A reflected image of such target having the same size as the target surface would appear at a location equal to two focal lengths behind the lens. Therefore, the four quadrant detector 33 would typically be located at that point behind the lens system. If the target is now re-positioned further than two focal lengths from the lens system, a smaller but more intense image appears on the detector 33 which, as assumed, remains two focal lengths behind the lens system. The reduction of the image size in any quadrant of the detector tends to reduce the output voltage from that quadrant; however, the higher intensity of this smaller image tends to increase the output voltage from that quadrant. These opposing effects tend to balance out, rendering the output voltages from the detector independent of target distance from the sensor. Likewise, if the target is re-positioned closer to the lens system than two focal lengths, a larger but less intense image appears on the detector surface, tending to keep the output constant. In either situation, the de-focusing of the target image does not affect the symmetry of that image with respect to the optical axis; consequently, the de-focusing does not affect the output signal from the detector.

As mentioned, the four-quadrant detector 33 has a small central hole through which the fiber optic pipe 34 projects, thereby enabling the pipe to terminate at the point of principal focus of the lens while the detector is located rearward of that point. As illustrated in FIG. 3, the detector 33 is oriented so that quadrants 38 and 40 are bisected by the y or vertical axis, whereas quadrants 39 and 41 are bisected by the x or horizontal axis. In this configuration the output voltage from each quadrant bears a direct relationship to the displacement of the target image along either the x or y axis. Specifically, if the target surface is symmetrically centered about the optical aixs, equal areas of the target image appear in each quadrant of detector 33. Under such circumstances the output voltages from the four quadrants 38, 39, 40, 41 are equal. If the target is now displaced vertically (i.e. along the y-axis), the output voltages from quadrants 39, 41 remain equal to one another but an inequality develops between the voltages from quadrants 38 and 40, thereby signifying a y-axis displacement of the target surface. Likewise, a horizontal target displacement results in an inequality between the output voltages from quadrants 39 and 41.

Figure 5:
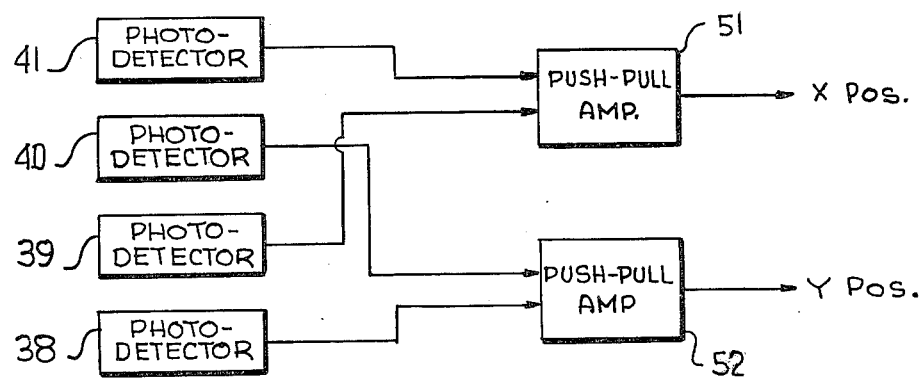
FIG. 5 is an electrical schematic diagram illustrating utilization of the signals provided by the four-quadrant detector of FIG. 3.

As illustrated in FIG. 5, the four quadrants 38, 39, 40 and 41 are connected to differential or push-pull amplifier circuits located externally of housing 10, although such amplifiers may be located within the housing if desired. Specifically, the voltages from quadrants 39 and 41 are applied to differential amplifier 51 which provides an output signal of amplitude proportional to the difference between its two input voltages. This output signal is proportional to the position of the target image along the x or horizontal axis. Likewise, amplifier 52 provides the y-axis displacement signal in response to the difference between the output voltages from quadrants 38 and 40. Amplifiers 51 and 52 may be any differential amplifier known in the art, including operational amplifiers which permit high gain to be achieved with high stability and simplified zero balance adjustement. This push-pull arrangement results in a highly sensitive position sensing capability.

For example, in a working model I have tested I found that a circular diffuse target surface of ¼-inch diameter, spaced one inch from the lens system, resulted in a sensitivity of approximately 10.0 volts per inch displacement of the target off the optical axis. Accurate sensing was achieved over a target distance of 1 ± 0.5 inches.

The target surface can be diffuse, or it can be entirely non-reflective as would be the case where a hole in the target is used as the surface to be sensed. However, the surface to be sensed, in either case, must have uniform reflectivity over the target area, and that area must be regular. By regular it is meant that the target surface must be configured such that it can be symmetrically disposed about the optical axis of the sensor system in both the vertical and horizontal directions. Examples of such regular surfaces are circles, squares, regular polygons, rectangles, ellipses, etc. It should also be noted that such regular target surfaces need not be disposed in a plane normal to the optical axis. For example, a circle located in a plane oriented at an angle to the optical axis projects an ellipse into the normal plane. The sensor output signals relate the position of the centroid of the projected ellipse to the optical axis; and the centroid of the projected ellipse is displaced from the optical axis by an amount equal to the displacement of the centroid of the circle in the skewed target area plane. In other words, the regular but skewed target area projects a regular target surface into the normal plane, and both are equally displaced from the optical axis.

Because of the high efficiency and sensitivity of the unit, the target surface can be diffusely reflecting material which allows a great many target objects to be used in their normally occurring state. Diffusely reflecting objects can be detected in either normal or skewed relation to the optical axis with equal sensitivity. Specularly reflective objects must be normal to the optical axis unless they have built-in corner reflectors; otherwise they will affect positional accuracy or be undetectable if the reflected component is out of the field of view of the sensor.

Due to the wide field of view (i.e. operable range of target distances) and efficiency of the system, it can accurately sense the position of both positive and negative targets. A positive target is defined as a rod end or boss protruding from a mechanical part. A negative target is defined as a hole or recess in a mechanical part. The position signal can be obtained while the target is moving because of the rapid response time of the system which does not require moving parts or contact with the target. The system is practically insensitive to ambient light since the sensing beam is coaxial with the reflected light. Ambient light coming from this direction is blocked by the sensor body itself, and ambient light incident at an oblique angle does not reflect back at an angle capable of entering the lens system. For diffuse reflecting targets some small portion of the ambient light may enter the lens system; however, the signal from the return image is so high that this reflected light is not high enough to appreciably affect the position signal.

The angle of the cone of output light from the forward end of fiber optic pipe 34 is matched to the lens system diameter so that substantially all of the light transmitted by the pipe is collimated by the lens. This feature, combined with the non-reflective coating on the inner wall of tube 44 and the black paint coating on the fiber optic pipe to prevent leakage, assures highly efficient light transfer and significantly optimizes the sensitivity of the system.

Heat sink 29 serves to dissipate heat generated by lamp 28. In addition, metal screws may be employed to project through metal casing 11 to contact the heat sink and thereby utilize the entire casing as a heat sink. The result is that a 1 watt lamp 28 causes no more than a 1°F temperature rise inside the case after being left on an entire day. The importance of this relates to the operation of the four-quadrant detector 33 which is temperature sensitive. Specifically, by maintaining a substantially constant temperature inside the unit, the voltage versus temperature characteristic of detector 33 is not brought into play and thereby does adversely affect sensing accuracy.

Figure 6:
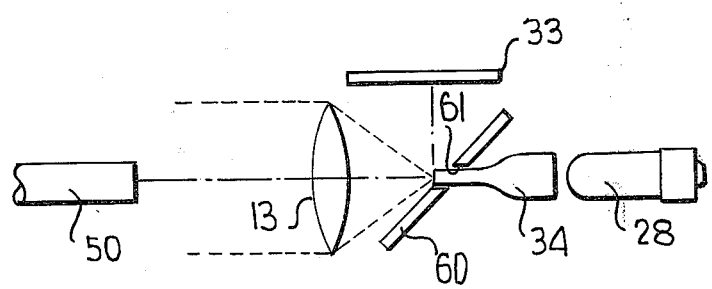
FIG. 6 is an optical schematic diagram of another embodiment of the optical sensor of the present invention wherein the detector is positioned off-axis.

As illustrated in FIG. 6, the four-quadrant detector 33 need not be located on the optical axis. Instead a mirror 60 may be employed to reflect the received target image off-axis onto detector 33. Such mirror 60 would have an aperture 61 defined therethrough to permit the fiber optic pipe to terminate at the principal focus of lens 13.

Figure 7:
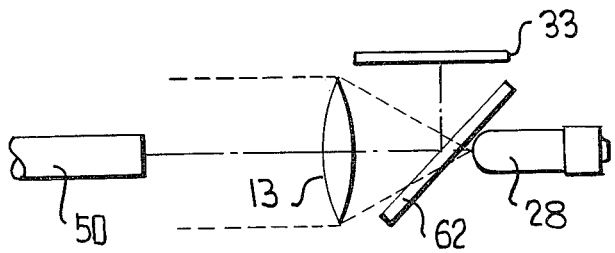
FIG. 7 is an optical schematic diagram of another embodiment of the optical sensor of the present invention wherein the fiber optic pipe is eliminated.
Figure 8:
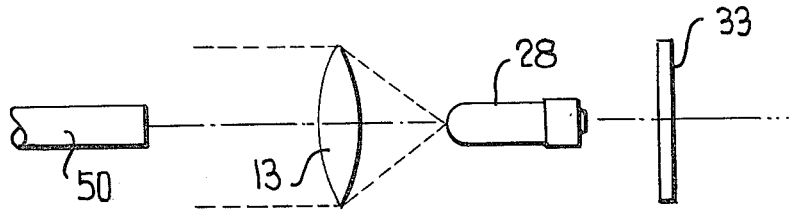
FIG. 8 is an optical schematic diagram of another embodiment of the optical sensor of the present invention wherein the light source is positioned in front of the detector.
Figure 9:
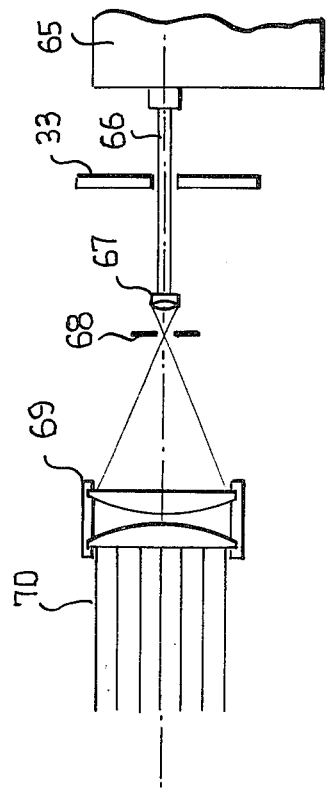
FIG. 9 is an optical schematic diagram of another embodiment of the optical sensor of the present invention wherein a laser is employed as a light source.

As illustrated in FIGS. 7, 8 and 9, it is also conceivable that one would want to eliminate the fiber optic pipe 34. In FIG. 7, for example, lamp 28 is itself located at the principal focus of lens system 13 and issues its light through a beam splitter 62 to lens system 13 where the light is collimated. The beam splitter 62 reflects the received image to the off-axis detector 33. Alternatively, as illustrated in FIG. 8, detector 33 may be located on the optical axis, in which case lamp 28 would be positioned forward of the detector at the principal focus of lens system 13. Elimination of fiber optic pipe 34 reduces the sensitivity of the unit and would necessitate use of a higher power lamp and/or a more reflective target. Nevertheless, the positioning of the source at the principal focus of the lens permit operation over a wide range of target distances and, in any case, the entire sensor is located in a single housing.

In FIG. 9 there is illustrated an embodiment having a laser 65 which serves as the source of target illumination. Laser 65 may be, for example, a helium-neon C. W. (i.e. - continuous wave) gas laser. The collimated laser beam is projected through a central aperture in quadrant detector 33 to a small de-collimating lens 67 which focuses the laser beam to a point image. This point image is located in a pinhole in an opaque panel 68, the pinhole serving as a spatial filter to eliminate secondary diffraction rings from the beam. The image from the decollimator is then passed on to a collimator lens 69 which provides an expanded beam 70 of coherent laser light with lower beam spread than the original beam 66. Sensing occurs in the same manner as described above for the embodiments of FIGS. 4, 6, 7 and 8. Very high efficiencies and increased accuracy are available with coherent light; however, there is a tradeoff of additional cost, size and weight.

Figure 10:
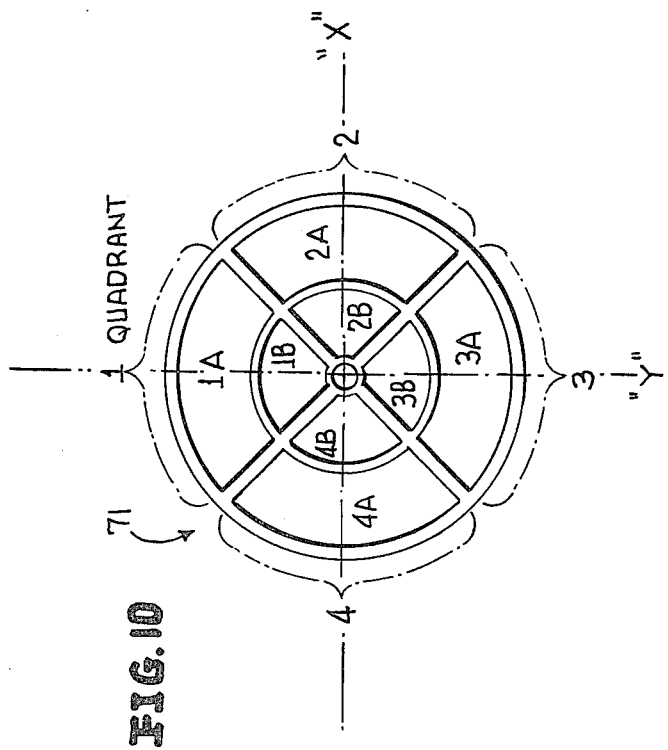
FIG. 10 is a plan view of alternative forms of the four-quadrant detector.

As described previously herein, the size of the reflected image appearing on the detector varies with the position of the object on the beam axis (i.e. the Z-axis). Specifically, the area of the image on the detector is proportional to the square of the distance of the object from the sensing system. It should be noted that this relationship is approximate for a relatively thin lens located at the entrance 14 of the sensing system; however, because of the square law relationship, fairly accurate Z-axis distances can be determined by the area of the reflected target image at the detector. In order to take advantage of this feature, each quadrant of the detector is sub-divided into discrete radially-spaced segments. For example, such a detector 71 is illustrated in FIG. 10. Each of the quadrants 1, 2, 3, and 4 are sub-divided into two segments 1A, 1B, 2A, 2B, 3A, 3B, and 4A, 4B. Each segment is an independent thin-film photovoltaic cell which provides an output voltage proportional to the intensity of the total light energy impinging thereon. The A and B segments in each quadrant subtend 90° of arc and have equal radial lengths. The size and configuration are not critical, however, as the segments may have equal areas, or proportional area relationships, or other predetermined relationship which permits the output voltages from the segments to be properly weighted and balanced relative to one another.

The outer segment A in each quadrant receives no portion of the reflected image if the image is small, as would be the case for a target object located relatively far from the sensor. If the target is gradually moved toward the sensor, the target image on detector 71 increases in size so that a portion of the image falls in segments A. Thus, the presence of target image in one or more A segments may be utilized to indicate that the target is closer than a predetermined spacing from the sensor. Alternatively, a range of distances between target object and sensor may be sensed by monitoring the levels of the output voltages from segments A and B with prior knowledge of relative sizes of these segments. In this regard, it should be noted that the detector quadrants may be further segmented into multiple segments to permit more accurate Z-axis sensing; that is, the presence of image in various ones of multiple quadrant segments indicates discrete spacings between the target and sensor.

Figure 11:
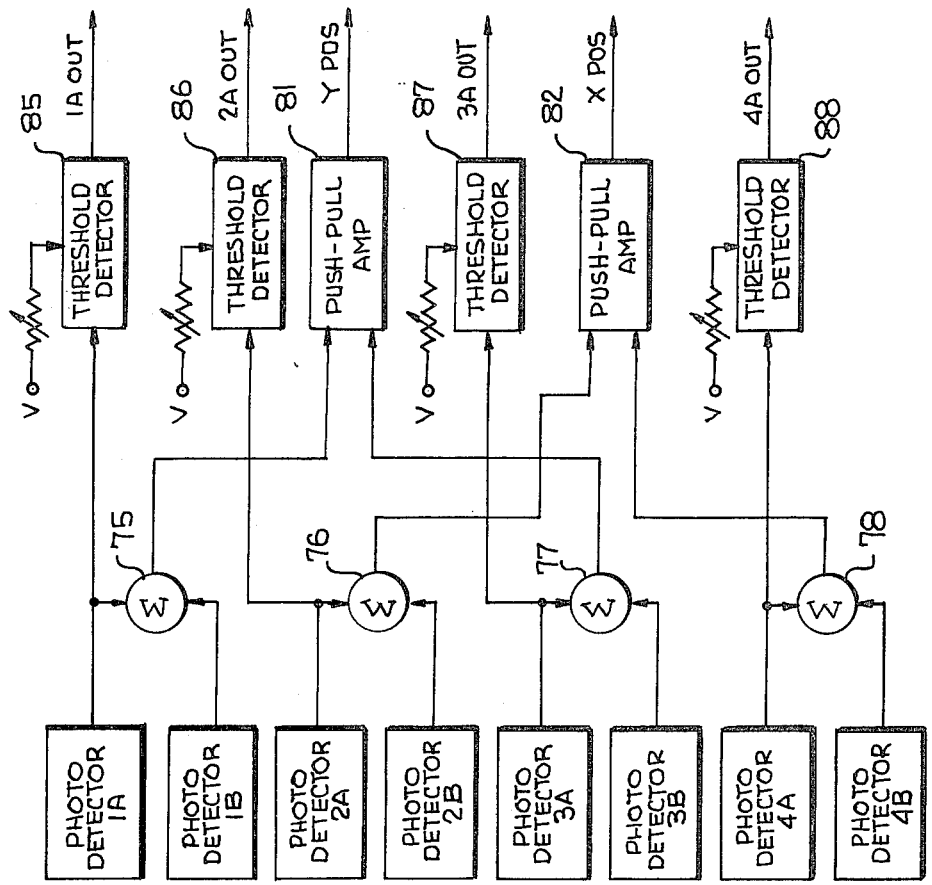
FIG. 11 is an electrical schematic diagram illustrating utilization of the signals provided by the four-quadrant detector of FIG. 9.

An electrical circuit for processing the output signals from detector 71 is illustrated schematically in FIG. 11. Specifically, the circuit of FIG. 11 permits the output voltages from each segment to be used in monitoring displacement along the X, Y and Z axes. The output voltages from detector segments 1A and 1B are summed in summing circuit 75. Similar summing circuits 76, 77, 78 are provided for the signals from detector segments in quadrants 2, 3, 4 respectively. Each summing circuit thus provides an output voltage proportional to the total image appearing in the corresponding quadrant. In this regard, the output voltage from summing circuits 75, 76, 77, and 78 in FIG. 11 correspond to the output voltages from detectors 38, 39, 40 and 41 in FIG. 5. Thus by combining the output voltages from circuits 76 and 77 at push-pull amplifier 81, the circuit provides a Y POS signal proportional to displacement of the target on the Y axis. Likewise, push-pull amplifier 82 combines the signals from circuits 76 and 78 to provide an X POS signal proportional to displacement of the target along the X-axis.

The output voltages from each of the segments 1A, 2A, 3A and 4A are applied to respective threshold detectors 85, 86, 87 and 88. These threshold detectors have adjustable thresholds to permit appropriate weighting of segment signal. If the threshold is exceeded the threshold detector provides an output signal to thereby indicate that the target is within a predetermined spacing from the sensor along the Z-axis. The threshold change may of course be similarly used to indicate that the target is outside the predetermined range of spacing from the sensor.

The system as described employs externally-supplied d.c. power for lamp 28. It should be noted, however, that housing 10 could be readily adapted to contain a battery or other suitable voltage source for the lamp. In either case, all sensor components are located within housing 10 and can be removed for servicing. The resulting sensor is compact and its components are pre-aligned, thereby requiring little adjustment by the end user. The optical axis of the lens system automatically determines the origin (i.e. 0.0 point) in the sensed $x, y$ plane.

It should also be noted that the tapered fiber optic pipe 34 need not be straight but instead may be curved as desired to suit particular housing configurations. In such case, lamp 28 need not be on the central axis but could be otherwise positioned and directed. The important points are that the light from the lamp must be directed into the wider end of pipe 34 and that the narrow end of the pipe must be positioned at the principal focus of lens system 13.

While I have described and illustrated specific embodiments of my invention, it will be clear that variations of the details of construction which are specifically illustrated and described may be resorted to without departing from the true spirit and scope of the invention as defined in the appended claims.

I claim:

1. An optical position sensor for determining the position of an object, said sensor being characterized by a common housing for all sensor components and including:
 a low power lamp;
 a tapered fiber optic pipe having a wider end positioned adjacent said lamp to receive light emitted from said lamp, the opposite end of said pipe being narrow such that light from said lamp has a greater flux density at said narrow end than at said wider end;
 a lens system having a point of principal focus and a predetermined optical axis, said lens system positioned relative to said fiber optic pipe such that the narrow end of said pipe resides at the principal focus of said lens system, said lens system being arranged to collimate substantially all of the light emitted from the narrow end of said pipe into a sensing beam directed out of said housing and imaged substantially at infinity; and
 a photo-sensitive detector positioned within said housing to intercept light reflected from said object back through said lens system and into said housing, said photo-sensitive detector including means for providing electrical signals indicative of the position of said object.

2. The sensor according to claim 1 wherein said photo-sensitive detector is positioned between said lamp and said lens system and includes an aperture through which said fiber optic pipe extends.

3. The sensor according to claim 2 wherein said photo-sensitive detector is a four-quadrant detector having four photo-sensitive elements of the same configuration disposed in a common plane about said aperture, each element subtending an angle of approximately 90° and arranged to provide a voltage proportional to the light energy impinging thereon.

4. The sensor according to claim 3 wherein said lamp and said fiber optic pipe are positioned along said predetermined axis.

5. The sensor according to claim 1 wherein said housing is metal and further comprising:
 a heat sink disposed within said housing about said lamp; and
 means for conducting heat between said heat sink and said housing.

6. The sensor according to claim 1 wherein said narrow end of said fiber optic pipe is configured such that all of the light emitted therefrom impinges upon said lens system, and wherein the outer surface of said fiber optic pipe bears a light absorbant coating.

7. The sensor according to claim 1 wherein said housing includes a longitudinally-extending generally cylindrical bore within which said lamp, said fiber optic pipe, said photo-sensitive detector and said lens system are removably disposed.

8. The sensor according to claim 1 wherein said photo-sensitive detector is positioned off-axis with respect to said sensing beam, and further comprising a reflector positioned to direct toward said detector the light reflected by said body back through said lens system.

9. The sensor according to claim 8 wherein said reflector includes an aperture through which said fiber optic pipe projects.

10. The sensor according to claim 1 wherein said sensing beam is directed along said predetermined axis, and wherein said photo-sensitive detector includes means for providing signals having amplitudes proportional to displacement of said object normal to said predetermined axis.

11. The sensor according to claim 10 wherein said photo-sensitive detector is a four-quadrant detector having four photo-sensitive elements of the same configuration disposed in a common plane about said aperture, each element subtending an angle of approximately 90° and arranged to provide a voltage proportional to the light energy impinging thereon.

12. The sensor according to claim 11 wherein said four photo-sensitive elements are each segmented into plural independent photo-sensitive segments positioned at different radial locations about the center of said detector, whereby the presence of reflected object image on different segments indicates different positions of said object along said predetermined axis.

13. The sensor according to claim 1 wherein said sensor beam is directed along said predetermined axis, and whrein said photo-sensitive detector includes means for providing signals as a function of the position of said object along said predetermined axis.

14. A sensor for determining the position of a body having a diffuse regularly configured surface, said sensor comprising:

lens means having an optical axis and a point of principal focus, said lens system being configured to transmit light emanating from said point of principal focus, the transmitted light taking the form of a sensing beam disposed concentrically about said optical axis and imaged at infinity;

source means for providing light which emanates from said point of principal focus and is substantially entirely received and transmitted by said lens system;

detector means for intercepting light of said sensing beam reflected by said diffuse surface back through said lens means and for providing an electrical signal indicative of the position of said diffuse surface, said detector means being located substantially further from said lens means than said point of principal focus; and a common compact housing containing said lens means, said source means and said detector means.

15. The sensor according to claim 14 wherein said source means comprises a laser arranged to emit a coherent beam of light and a decollimating lens arranged to focus said coherent beam of light at said point of principal focus.

16. The sensor according to claim 14 wherein said electrical signal has an amplitude and polarity indicative of the asymmetry of said diffuse surface about said optical axis.

17. The sensor according to claim 14 wherein said electrical signal is indicative of the position of said diffuse surface along said optical axis.

* * * * *